Nov. 15, 1932.   S. GALL   1,887,806
SAUSAGE CASING
Filed Nov. 18, 1930
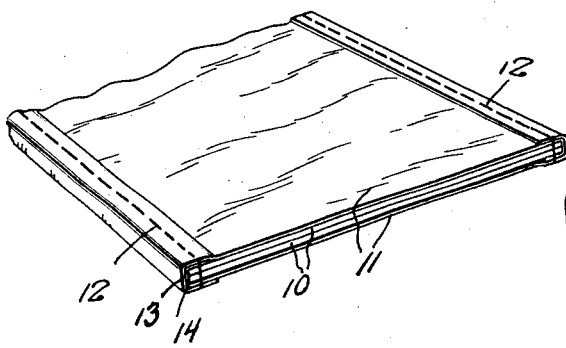
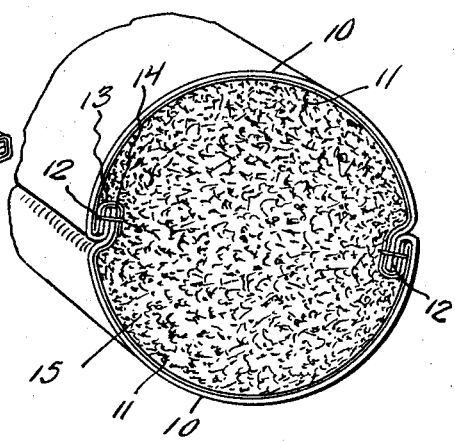
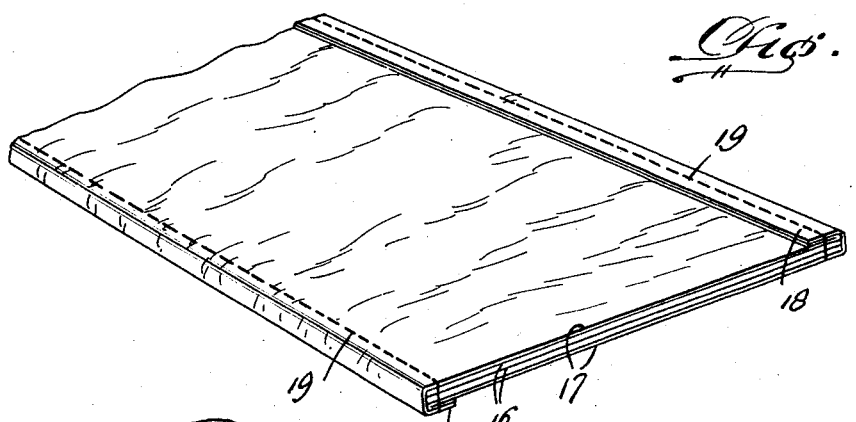
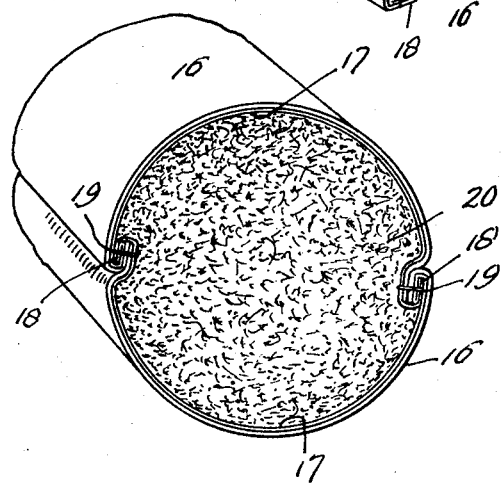
Stanley Gall
INVENTOR.
BY *Stanley Burch*
ATTORNEY.

Patented Nov. 15, 1932

1,887,806

UNITED STATES PATENT OFFICE

STANLEY GALL, OF CINCINNATI, OHIO

SAUSAGE CASING

Application filed November 18, 1930. Serial No. 496,502.

The present invention relates to sausage casings and comprehends a structure which is not only reinforced throughout its length, in the production of a strong and serviceable casing, but on which is particularly reinforced at the opposite sides or edges where the component parts of the casing are stitched together.

More specifically stated, the invention provides a casing of the character mentioned, which comprises superimposed layers of hog bung and beef round, and wherein the marginal edges of the beef round layers are folded over the adjacent edges of the hog bung layers, and stitched thereto in a manner to provide a reinforced sealed connection between said parts.

The nature and advantages of the invention will be better understood when the following detailed description is read in connection with the accompanying drawing, the invention residing in the construction, combination and arrangement of parts as claimed.

In the drawing forming part of this application like numerals of reference indicate similar parts in the several views and wherein:

Figure 1 is a fragmentary perspective view of a casing constructed in accordance with one embodiment of the invention.

Figure 2 is a similar view showing how the casing is used.

Figure 3 is a view similar to Figure 1 of a modified construction.

Figure 4 is a perspective view showing how the casing in Figure 3 is used.

Referring to the drawing in detail, and more particularly to Figures 1 and 2, I have illustrated a casing constructed in accordance with one embodiment of the invention, and wherein I make use of two relatively fixed layers of hog bung 10 of uniform area, arranged one upon the other. These layers are arranged between two relatively thin but strong tough layers of beef round 11 whose area is considerably greater than that of the hog bung layers 10, to provide for a reinforced sealed connection between the component parts of the casing along the marginal edges thereof. For this purpose, the corresponding marginal edges of the beef round layers 11, at opposite sides of the layers 10, are folded over the adjacent longitudinal edges of the latter, and as clearly illustrated in Figure 1, these corresponding marginal folded edges of the beef round layers 11 are folded toward each other and one within the other, to provide an effective leak proof connection between the component parts. These folded marginal edges of the layers 11 and the adjacent marginal edges of the layers 10 are then stitched together as at 12. These corresponding folded marginal edges of the beef round layers 11 are indicated at 13 and 14 respectively, and are of such dimensions as to not only provide a sealed connection between the component parts of the casing, but to also materially reinforce the casing along these lines. The casing is made in the manner hereinabove described and clearly illustrated in Figure 1, and after the marginal edges of the component parts have been stitched together, the casing is turned inside out as clearly illustrated in Figure 2 and then filled with meat products indicated at 15.

In Figures 3 and 4 I have illustrated a modified form of the invention, wherein the casing is made up of two relatively thick layers of hog bung 16 of uniform area arranged one upon the other, and between two layers of relatively thin but strong layers of beef round 17, the marginal edges of which project beyond the corresponding or adjacent longitudinal edges of the layers 16, so that they may be used in forming a sealed leak-proof connection between the component parts of the casing. For this purpose, the corresponding edge extensions of the beef round layers 17 are folded upon themselves, and then folded across the adjacent longitudinal edges of the hog bung layers 16, with the folded marginal edges 18 lying upon the upper and lower surfaces of the casing as the latter is made, and as clearly illustrated in Figure 3. These folded edges of the beef round layers 17 completely envelop the adjacent marginal edges of the layers 16 and not only provide a sealed connection, but are all subsequently stitched together as at 19 in a manner to effectively reinforce the casing along the line of stitching. Obviously, in either form of the invention I provide a casing of the character mentioned composed of inner and outer layers of relatively different material, varying in thickness, which not only produces a strong and serviceable casing for the purpose intended, but one wherein the layers are stitched together in a manner to provide reinforced sealed connections between the component layers. After the casing has been produced in the manner illustrated in Figure 3, it is turned inside out and then filled with meat product 20 as clearly illustrated in Figure 4.

While it is believed that from the foregoing description the nature and advantages of the invention will be readily apparent, I desire to have it known that I do not limit myself to what is herein illustrated and described, and that such changes may be resorted to when desired as fall within the scope of what is claimed.

What I claim as new is:

As a new article of manufacture, a sausage casing comprising a pair of relatively thick layers of material normally arranged in face to face contact, and a pair of relatively thin layers of material arranged above and below said thick layers, the marginal edges of one of said thin layers being folded over and under the adjacent edges of the thick layers, the corresponding marginal edges of the other thin layer being folded under and over the edges of the thick layers, and stitching securing all of said layers together through the folded edges, and said casing being turned inside out for use arranging the edges within the casing.

In testimony whereof I affix my signature.

STANLEY GALL.